United States Patent [19]

Johnson et al.

[11] 4,365,816

[45] Dec. 28, 1982

[54] SELF-DAMPING BELLOWS SEAL ASSEMBLY

[75] Inventors: Norman E. Johnson, Barrington; Daniel F. Vasconcellos, East Greenwich, both of R.I.

[73] Assignee: EG&G Sealol, Inc., Warwick, R.I.

[21] Appl. No.: 202,344

[22] Filed: Oct. 29, 1980

[51] Int. Cl.³ .............................................. F16J 15/36
[52] U.S. Cl. ....................................... 277/88; 277/92; 277/93 R
[58] Field of Search ................................. 277/88–90, 277/92, 93 R, 93 SD, 38–43

[56] References Cited

U.S. PATENT DOCUMENTS

| | | |
|---|---|---|
| Re. 23,898 | 11/1954 | Haake . |
| 1,716,992 | 6/1929 | Varden ................................ 277/88 |
| 2,100,220 | 11/1937 | King .................................... 277/88 |
| 2,237,494 | 4/1941 | McCormack ..................... 277/88 X |
| 2,463,695 | 3/1949 | Jensen .................................. 277/89 |
| 2,574,808 | 11/1951 | Wolfe .................................. 277/88 |
| 2,784,016 | 3/1957 | Heimbuch . |
| 2,884,268 | 4/1959 | Amirault et al. ................. 277/92 X |
| 2,939,730 | 6/1960 | Turpin ................................. 277/89 |
| 3,018,112 | 1/1962 | Amirault et al. ................. 277/89 X |
| 3,020,052 | 2/1962 | Gits .................................... 277/89 |
| 3,372,939 | 3/1968 | Coulombe et al. ................. 277/88 |
| 3,391,942 | 7/1968 | Wilson ................................. 277/89 |
| 3,782,735 | 1/1974 | Novosad ........................... 277/92 X |
| 3,977,465 | 8/1976 | Tank ................................. 277/88 X |
| 4,163,563 | 8/1979 | Mullaney ............................ 277/88 |

FOREIGN PATENT DOCUMENTS

| | | | |
|---|---|---|---|
| 47-4684 | 9/1972 | Japan .................................. 277/88 |
| 53-49661 | 6/1978 | Japan . |
| 592996 | 10/1947 | United Kingdom ................. 277/89 |
| 601296 | 5/1948 | United Kingdom ................. 277/88 |
| 751295 | 6/1956 | United Kingdom ................. 277/93 |

Primary Examiner—Robert S. Ward, Jr.
Attorney, Agent, or Firm—Finnegan, Henderson, Farabow, Garrett & Dunner

[57] ABSTRACT

A self-damping bellows seal assembly for providing a seal between a rotatable shaft and a stationary member through which the shaft extends. The assembly includes a flexible bellows surrounding the shaft and secured at one end thereto. An annular face seal is fixed and sealed to the other end of the bellows and is biased by the bellows into sealing engagement with the stationary member. The means which secures and seals the face seal to the bellows includes a flexible member which closely surrounds the shaft and dampens vibrations induced in the bellows. The bellows seal assembly includes stamped sheet-metal parts and can be used when the assembly is to be secured to the stationary member and the face seal to engage a radial face on the shaft.

22 Claims, 3 Drawing Figures

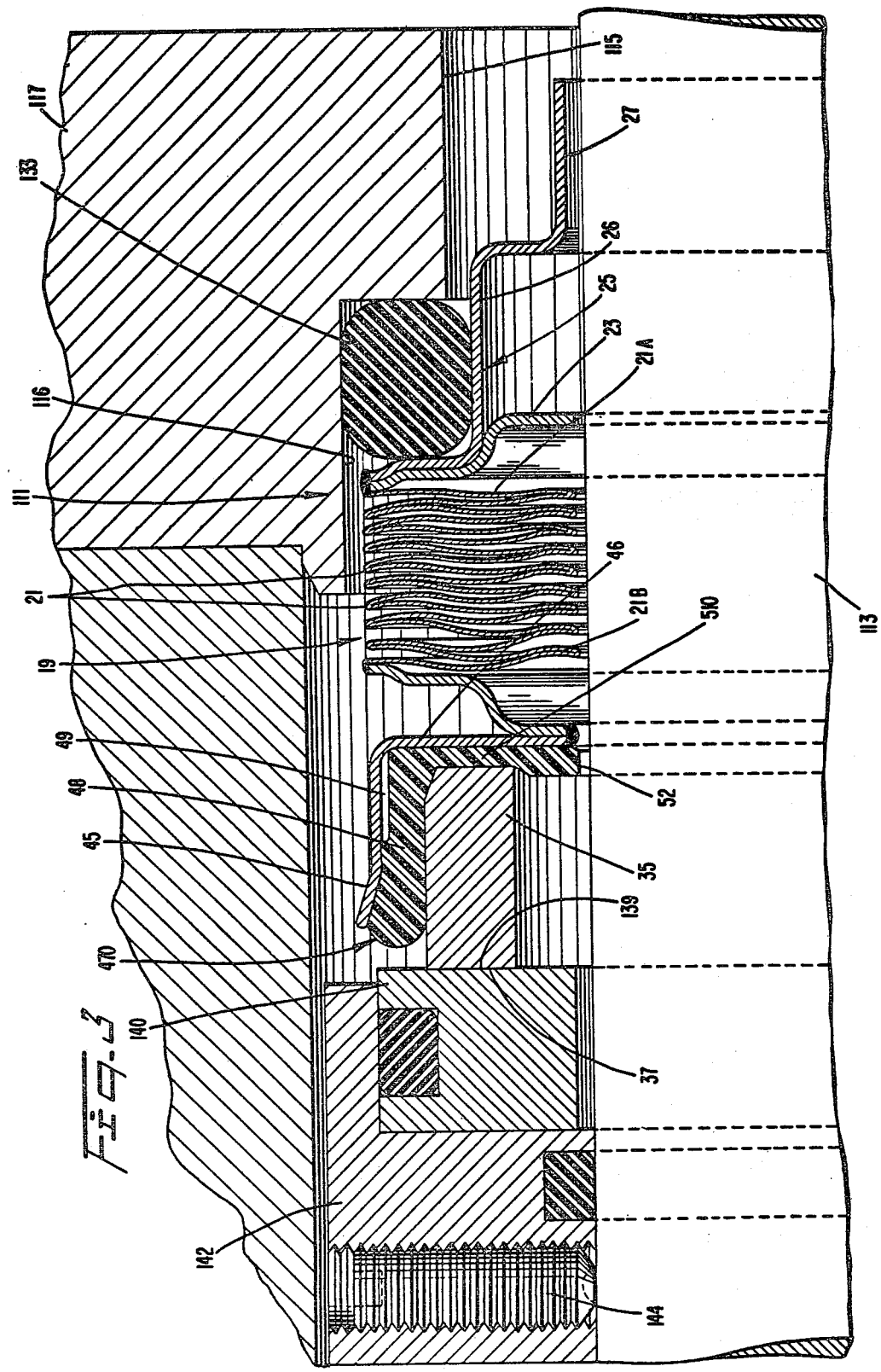

SELF-DAMPING BELLOWS SEAL ASSEMBLY

BACKGROUND OF THE INVENTION

The present invention relates to seals for rotating shafts, and more particularly to a bellows-type shaft seal having a self-damping construction.

High speed fluid handling machinery such as rotary pumps, compressors and mixers often employ face seals between a rotating shaft and stationary supporting structure surrounding the shaft. One version of these seals includes a hard annular member or ring which rotates with the shaft and sealingly engages a radial face on the stationary supporting member. The ring surrounds the shaft and is biased into sealing engagement with the radial face by a flexible annular bellows which also surrounds the shaft and forms part of the seal.

In another version, the hard annular ring is sealingly carried by the stationary supporting member and is biased into sealing engagement with a radial face of a member fixed to the shaft by a flexible bellows which forms part of the seal between the ring and the stationary member.

One of the problems with seal assemblies of this type, particularly the version which utilizes a bellows and ring which rotates with the shaft, is that during use, vibrations are induced in the bellows as a result of face friction between the rubbing seal parts, dry running or cavitation, fluid pressure pulsation or turbulence, vibration of other parts, etc. This causes the bellows to become work-hardened and lose its resiliency. Moreover, the bellows is, in effect, a spring, and if it is caused to vibrate in a harmonic mode, it can fracture. Many attempts have been made to overcome the problems resulting from induced vibration in seals of this type but, in general, they are not satisfactory in their performance or they result in an expensive construction.

SUMMARY OF THE INVENTION

The present invention solves the problem of induced vibration in the bellows of a rotating face seal by providing a self-damping construction which is both effective and is low in cost. The present invention makes use of structure which is incorporated in the seal assembly to provide a self-damping construction for preventing work-hardening or destruction of the bellows.

Furthermore, the seal assembly of this invention is readily adaptable for use in both rotating and stationary seal installations facilitating standardization of parts and manufacturing processes and resulting in lower overall costs.

Additional objects and advantages will be set forth in part in the description which follows, and in part will be obvious from the description, or may be learned by practice of the invention. The objects and advantages of the invention may be realized and obtained by means of the instrumentalities and combinations particularly pointed out in the appended claims.

To achieve the objects and in accordance with the purposes of the invention, as embodied and broadly described herein, the self-damping bellows seal assembly of this invention is constructed for use with a rotatable shaft and a stationary member having an opening through which the shaft extends, the seal assembly providing a fluid pressure seal between the shaft and the stationary member, the seal assembly including a flexible bellows adapted to surround the shaft, means for securing one end of the bellows with respect to the shaft, an annular face seal adapted to sealingly engage a radial face on the stationary member, means securing the annular face seal with respect to the other end of the bellows, the securing means including a flexible annular member adapted to closely surround the shaft and operable to dampen vibrations induced in the bellows.

In another aspect, the present invention is directed to a seal assembly which comprises a stationary member having an opening, a rotatable shaft extending through the opening, a fluid pressure seal between the shaft and the stationary member including a flexible bellows surrounding the shaft, means for securing one end of the bellows with respect to the shaft, an annular face seal sealingly engaging a radial face on the stationary member, means securing the annular face seal with respect to the other end of the bellows, the securing means including a flexible annular member closely surrounding the shaft and operable to dampen vibration in the bellows.

In yet another aspect, the present invention is directed to a seal assembly which is constructed for use with a rotatable shaft and a stationary member having an opening through which the shaft extends, the seal assembly adapted to provide a fluid pressure seal between the shaft and the stationary member, the seal assembly including a flexible bellows adapted to surround the shaft, means for securing one end of the bellows with respect to one of the shaft and stationary member, an annular face seal adapted to sealingly engage a radial face on the other of the shaft and stationary member, means securing the annular face seal with respect to the other end of the bellows including a flexible annular member adapted to surround the shaft and projecting radially inwardly between the bellows and the annular face seal.

In still another aspect, the present invention is directed to a seal assembly which is constructed for use with a rotatable shaft and a stationary member having an opening through which the shaft extends, the seal assembly adapted to provide a fluid pressure seal between the shaft and the stationary member, the seal assembly including a flexible bellows adapted to surround the shaft, means for securing one end of the bellows to one of the shaft and stationary member, the securing means including an annular, stamped sheet metal part joined at one end to the bellows and having an intermediate axial portion adapted to sealingly cooperate with the one of the shaft and stationary member through an annular packing therebetween, an annular face seal adapted to engage a radial face on the other of the shaft and stationary member, means securing the annular face seal with respect to the other end of the bellows including an annular, stamped sheet-metal part fixed at one end to the bellows and having an axial portion surrounding the face seal, and a flexible annular member between the face seal and the axial portion of the last mentioned stamped sheet-metal part.

The accompanying drawings which are incorporated in and constitute a part of this specification, illustrate an embodiment of the invention and, together with the description, serve to explain the principles of the invention.

BRIEF DESCRIPTION OF THE DRAWINGS

FIG. 3 illustrates some parts of the embodiment of FIG. 1 installed in an alternative embodiment as a stationary seal.

DESCRIPTION OF THE PREFERRED EMBODIMENT

Reference will now be made in detail to the present preferred embodiment of the invention, an example of which is illustrated in the accompanying drawing.

Figure 1:
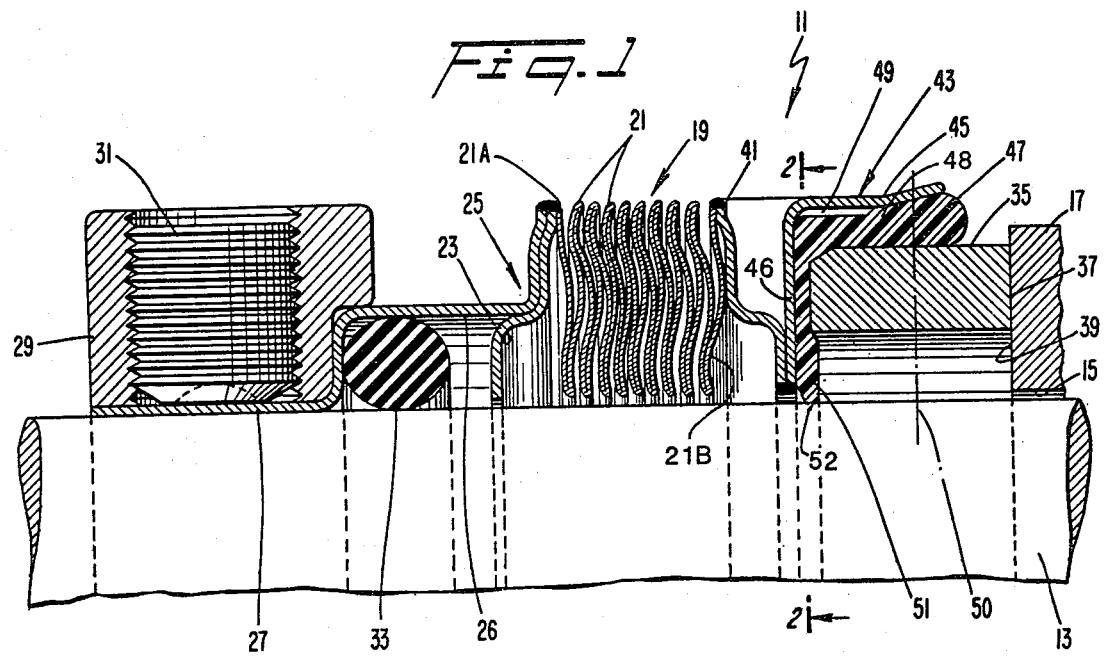
FIG. 1 is a cross-sectional view of a self-damping bellows seal assembly constructed in accordance with the present invention shown installed as a rotating seal.

The preferred embodiment of the self-damping bellows seal assembly is shown in FIG. 1 and is represented generally by the numeral 11. This assembly is constructed for use with a rotatable shaft 13 which extends through an opening 15 in a stationary member 17 and provides a fluid pressure seal between the shaft and stationary member. The shaft 13 can be rotated by any suitable source (not shown), for example, an electric motor. In that case the stationary member 17 is rigid with or connected to the motor housing.

In accordance with the invention, the seal assembly includes a flexible bellows adapted to surround the shaft and means for securing one end of the bellows with respect to one of the shaft and stationary member. As embodied herein, a flexible bellows 19 having a plurality of convolutions 21 is shown in spaced surrounding relation to the shaft 13. The bellows convolutions 21 are resiliently expandable in an axial direction and can be constructed of a series of annular discs or plates welded together alternately at their inner and outer edges to form a highly resilient construction. A spring-like metal or other like material can be selected for the discs in accordance with the environment to which the bellow will be exposed. Since it is intended that the seal assembly function in a fluid environment, it is necessary that the bellows itself form a seal to prevent fluid from passing between the faces of convolutions 21.

As further embodied herein and shown in FIG. 1, the left-most convolution 21A of the bellows 19 is suitably secured along its outer edge as by welding to an annular bellows adaptor 23 which, in turn, is secured by welding to a tailpiece 25. All three pieces can be secured to each other as by welding in one pass as shown. The tailpiece 25 is also annular and has an intermediate axial portion 26 in spaced surrounding relation to the shaft 13 and a reduced portion 27 which closely surrounds the shaft 13. Both the adaptor 23 and tailpiece 25 are constructed of stamped sheet-metal and, when joined together, form a stamped sheet-metal part.

A clamp ring 29 surrounds the tailpiece portion 27 and is provided with set screws 31 which secure the tailpiece 25 and, therefore, the bellows 19 to the shaft 13. Preferably, three such set screws 31 are provided, two displaced 45° from the center one of the set screws. It should be noted that this method of clamping prevents any damage or marring of the shaft or sleeve because the set screws 31 engage the tailpiece portion 27, and not the shaft 13. The adapter 23 and tailpiece 25 form part of the bellows seal assembly so that the weld joints between these members and the bellows convolution 21A should be continuous and fluid tight. An annular packing of any material but shown as an O-ring 33 is positioned between the tailpiece axial portion 26 and the shaft 13 and provides a static fluid seal therebetween.

In accordance with the invention, the seal assembly includes an annular face seal adapted to sealingly engage a radial face on the other of the shaft and stationary member. As embodied herein and shown in FIG. 1, an annular rubbing member 35 surrounds the shaft 13 and has a radial face 37 adapted to sealingly engage a radial face 39 on the stationary member 17. As is known in the art, the rubbing member 35 is constructed of either a soft material such as carbon, or a very hard material such as silicon carbide or tungsten carbide, and its radial face 37 is dressed for flatness such as by lapping.

In accordance with the invention, means is provided for securing the annular face seal with respect to the other end of the bellows. As embodied herein, an annular bellows adaptor 41 is secured as by welding to the outer edge of the right-most convolution 21B of bellows 19. The inner edge of the adaptor 41 is secured as by welding to a rigid annular cup 43 which is L-shaped in cross-section. Both the adaptor 41 and cup 43 are constructed of stamped sheet-metal and, when joined together, form a stamped sheet-metal part. The cup 43 has an outer axial portion 45 which surrounds a portion of the rubbing member 35 and a rear portion 46 to which the adaptor 41 is welded and which extends radially toward the shaft 13 but is spaced therefrom.

Like the welds between the bellows convolution 21A, the adaptor 23, and the tailpiece 25, the welds between bellows convolution 21B, adaptor 41, and cup 43 must be continuous and fluid tight. Also, the adaptors 23 and 41 are joined to the outer radial edges of convolutions 21A and 21B, respectively, and have portions which extend radially inwardly from their outer edges in close relation to the convolutions 21A and 21B to provide stability in the bellows 19 while not unduly inhibiting its flexibility.

In accordance with the invention, the means for securing the annular face seal with respect to the other end of the bellows includes a flexible annular member which, when the assembly is used as a rotating seal, is adapted to closely surround the shaft and operable to dampen vibrations in the bellows. As embodied herein, a face packing and damper 47 is provided between the cup 43 and the rubbing member 35. The packing 47 may be constructed of a rubber or rubber-like material such as Viton (a trademark of E. I. duPont de Nemours). The packing 47 is molded to shape and has an outer portion 48 between the outer portion 45 of the cup 43 and the rubbing member 35 and which surrounds the latter and serves as a seal between these parts. The material of the packing 47 is sufficiently resilient (compressible) to allow the annular rubbing member 35 to be pressed into the cup 43 and yet prevents undue (compressive) stresses on the rubbing member 35 which might either crack or distort it. Preferably, a small relief 49 is formed at the rear end of the packing 47 to insure that compression loading on the rubbing member 35 is substantially equally spaced to either side of its axial centroid 50. This further insures minimum distortion of the rubbing member 35. In addition, the relief 49 simplifies assembly of the parts.

As still further embodied herein and shown in FIG. 1 which depicts the assembly 11 installed as a rotating seal, the packing 47 has a portion which closely surrounds or lightly engages the shaft 13. The packing 47 has a rear portion 51 which extends radially of the shaft between the rubbing member 35 and the cup 43. The packing portion 51 terminates inwardly at an opening 52 through which the shaft 13 extends. If desired, a plurality of reliefs 54 spaced equally around the opening 52 form a plurality of pads 56 which lightly engage, or form a very close clearance around, the shaft 13. The pads 56 perform the desired damping function hereinafter described and the reliefs 54 reduce drag between the packing 47 and the shaft 13 (which would inhibit axial movement of the packing 47) and prevent fluid from being trapped between the packings 47 and 33.

In use, the bellows seal assembly 11 shown in FIG. 1 rotates with the shaft 13. The bellows 19 forms part of the seal and also acts as a spring which biases the rubbing member 35 into sealing engagement with the radial face 39 on the stationary member 17. Any vibrations in the device arising as a result of face friction between the members 35, 17, dry running or cavitation, fluid pressure pulsation or turbulence, vibration of other parts, etc., induce vibrations in the bellows 19 which is, in effect, a spring. These vibrations can be very destructive of the bellows 19 by causing work-hardening of the convolutions, and can possibly cause the bellows to fracture, particularly if the vibrations induced are in a harmonic mode.

However, by means of the present invention, the face packing 47 which closely surrounds or lightly engages the shaft 13 at the pads 56, serves to dampen vibrations induced in the bellows 19 and prevents work-hardening or failure of the bellows. Importantly, the face packing 47 does not inhibit operation of the device in its intended mode and serves important functions in that it provides a seal between the cup 43 and the rubbing member 35, provides for minimum stress and distortion of the rubbing member 35, and serves as a vibration damping means. It will be appreciated that minimum additional cost is incurred for this construction. In addition, by mounting the rubbing member 35 in the face packing 47, the rubbing member can be easily removed and replaced.

In accordance with another feature of the invention, the seal assembly includes means for securing one end of the bellows with respect to one of the shaft and the stationary member, and the annular face seal is adapted to sealingly engage a radial face on the other of the shaft and radial member. This allows the assembly to be used in both rotating seals and stationary seals.

Figure 2:
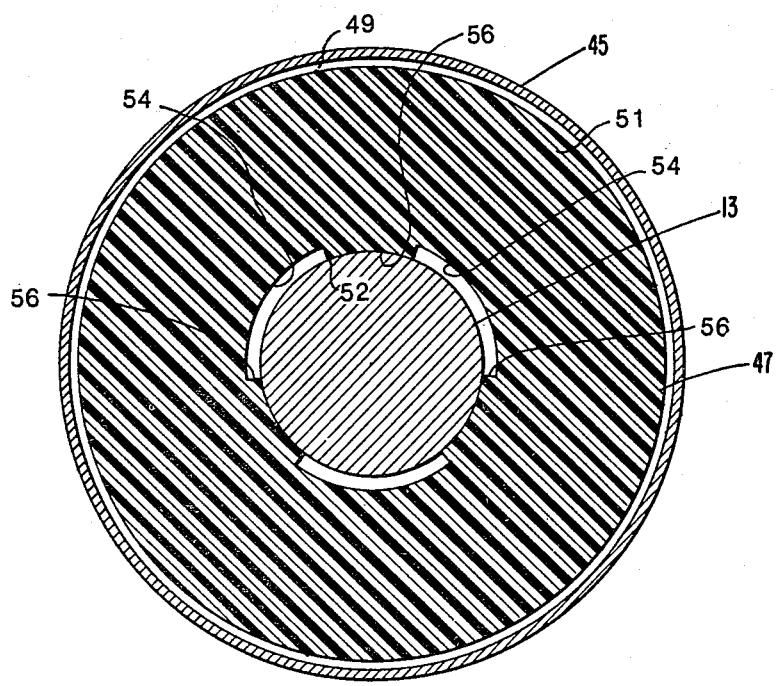
FIG. 2 is a sectional view of FIG. 1 taken along the line 2—2 thereof.

As embodied herein and shown in FIG. 3, a seal assembly 111 constructed in accordance with the invention and, which includes some parts of the embodiment of FIGS. 1 and 2, is installed as a stationary seal. In this installation, a stationary member 117 is provided with an opening formed by a bore 115 through which a rotating shaft 113 extends. The tailpiece 25 extends into the opening 115 and is sealed to the member 117 by a packing 133 which is positioned between the outer surface of intermediate axial portion 26 and the surface of a counterbore 116 around the bore opening 115. In addition to providing a seal, packing 133 provides sufficient friction to secure the seal assembly 111 in place and against rotation on the stationary member 117.

The rubbing member 35 has its radial face 37 positioned to sealingly engage a radial face 139 on a ring 140 sealed to a collar 142 which is fixed to the shaft 113 by set screws 144. The bellows 19 acts as a spring to hold the faces 37 and 139 in sealing engagement.

In the embodiment of FIG. 3, there is clearance between the rear portion 510 of the face packing 470 and the shaft 113 so that no vibration damping is provided in this installation. However, vibration is not as serious a problem in stationary seals as in rotating seals. As shown seal assemblies 11 and 111 utilize some identical component parts which carry like numerals in all the figures.

It will be appreciated that since some identical component parts can be used in both rotating and stationary installations, greater standardization of parts and manufacturing processes results which ultimately lowers prices to the consumer.

By the foregoing, there has been disclosed an improved self-damping bellow seal construction calculated to fulfill the inventive objects set forth herein. It will be apparent to those skilled in the art that various additions, substitutions, modifications and omissions can be made to the assembly of the present invention without departing from the scope or spirit of the invention. Thus, it is intended that the present invention covers the additions, substitutions, modifications and omissions provided they come within the scope of the appended claims and their equivalents.

What is claimed is:

1. A self-damping bellows seal assembly for use with a rotatable shaft and a stationary member having an opening through which said shaft extends, said seal assembly providing a fluid pressure seal between said shaft and said stationary member, said seal assembly including a flexible metal bellows having a plurality of convolutions and adapted to surround said shaft, means for securing one end of said bellows with respect to said shaft, an annular face seal adapted to sealingly engage a radial face on said stationary member, an annular metal part welded at one end to said bellows and having an axial portion surrounding said face seal and a flexible annular member interposed between said face seal and the axial portion of said annular part, said flexible annular member being adapted to closely surround said shaft and to actively operate to dampen vibration in said bellows.

2. A self-damping bellows seal as claimed in claim 1, said means securing said face seal with respect to the other end of said bellows including a rigid annular member surrounding and engaging said flexible annular member and fixed with respect to the other end of said bellows.

3. A self-damping bellows seal as claimed in claim 2, said flexible annular member being formed with a relief where it is spaced from said rigid annular member.

4. A self-damping bellows seal as claimed in claim 1, said flexible annular method having an opening through which said shaft is adapted to extend, a plurality of reliefs formed in said flexible member and spaced equally around said opening and forming a plurality of pads adapted to lightly engage said shaft.

5. A self-damping bellows seal as claimed in claim 1, said flexible annular member being substantially L-shaped in cross-section and having an outer portion which surrounds said annular face seal and a rear portion which extends radially of said shaft, said rear portion adapted to closely surround said shaft.

6. A self-damping bellows seal as claimed in claim 5, said rear portion terminating inwardly in an opening through which said shaft can extend, a plurality of reliefs formed in said rear portion spaced around said opening and forming pads adapted to lightly engage said shaft.

7. A self-damping bellows seal as claimed in claim 6, a rigid annular cup surrounding said flexible annular member and having an outer axial portion surrounding the outer portion of said flexible annular member and a rear portion extending radially of said shaft, said annular face seal being pressed into the outer portion of said flexible annular member.

8. A self-damping bellows seal as claimed in claim 1, said means for securing said one end of said bellows with respect to said shaft including an annular member fixed with respect to said bellows and adapted to surround said shaft, and packing means for positioning between said annular member and said shaft.

9. A self-damping bellows seal as claimed in claim 8, said flexible annular member forming a packing seal between said annular face seal and a rigid annular member which surrounds said annular seal and having a portion adapted to lightly engage said shaft, said last mentioned portion being provided with relief means which prevents fluid from being trapped between said flexible annular member and said packing means.

10. A self-damping bellows seal as claimed in claim 9, said annular member being fixed with respect to the outer edge of an end-most convolution at said other end of said bellows.

11. A self-damping bellows seal as claimed in claim 9, a first adaptor between and fixed to said annular member and said end-most convolution at the one end of said bellows, a second adaptor between and fixed to said rigid annular member and said end-most convolution at the other end of said bellows, said adaptors extending radially of said bellows.

12. A seal assembly comprising a stationary member having an opening, a rotatable shaft extending through said opening, a fluid pressure seal between said shaft and said stationary member including a flexible metal bellows having a plurality of convolutions and surrounding said shaft, means for securing one end of said bellows with respect to said shaft, an annular face seal sealingly engaging a radial face on said stationary member, an annular metal part welded at one end to said bellows and having an axial portion surrounding said face seal and a flexible annular member interposed between said face seal and the axial portion of said annular part, said flexible annular member closely surrounding said shaft and actively operable to dampen vibration in said bellows.

13. A seal assembly as claimed in claim 12, said flexible annular member having an opening through which said shaft extends, a plurality of reliefs formed in said flexible member and spaced equally around said opening and forming a plurality of pads which lightly engage said shaft.

14. A seal assembly as claimed in claim 13, a rigid annular cup surrounding said flexible annular member and having an outer axial portion surrounding an outer portion of said flexible annular member and a rear portion extending radially of said shaft, said annular face seal being pressed into the outer portion of said flexible annular member.

15. A seal assembly as claimed in claim 12, said means for securing said one end of said bellows with respect to said shaft including a rigid annular member fixed with respect to said bellows and surrounding said shaft, and packing means between said annular member and said shaft.

16. A seal assembly as claimed in claim 15, said flexible annular member forming a packing seal between said annular face seal and said rigid annular member and having a portion which lightly engages said shaft, said last mentioned portion being provided with relief means which prevents fluid from being trapped between said flexible annular member and said packing means.

17. A seal assembly constructed for use with a rotatable shaft and a stationary member having an opening through which said shaft extends, said seal assembly being adapted to provide a fluid pressure seal between said shaft and stationary member, said seal assembly including a flexible metal bellows having a plurality of convolutions and adapted to surround said shaft, means for securing one end of the bellows to said shaft, said securing means including an annular, stamped sheet-metal part joined at one end to said bellows and having an intermediate axial portion adapted to sealingly cooperate with said shaft through an annular packing therebetween, an annular face seal adapted to engage a radial face on the stationary member, means securing said annular face seal with respect to the other end of said bellows including an annular, stamped sheet-metal part fixed at one end to said bellows and having an axial portion surrounding said face seal, and a flexible annular member between said face seal and the axial portion of said last mentioned stamped sheet-metal part, said first mentioned stamped sheet-metal part including a portion adapted to closely surround said shaft and to be connected thereto by clamping means which presses said stamped sheet-metal part portion against said shaft.

18. A seal assembly as claimed in claim 17, said last mentioned sheet-metal part including an annular portion integrally formed with said axial portion and extending radially inwardly toward said shaft, and another annular portion integrally formed with said first mentioned annular portion and extending radially outwardly of said shaft and joined to said bellows at its outer edge.

19. A seal assembly as claimed in claim 17, said first mentioned stamped sheet-metal part including an annular sheet-metal adaptor and tailpiece which are welded in one pass to said bellows.

20. A seal assembly constructed for use with a rotatable shaft and a stationary member having an opening through which said shaft extends, said seal assembly being adapted to provide a fluid pressure seal between said shaft and stationary member, said seal assembly including a flexible metal bellows having a plurality of convolutions and adapted to surround said shaft, means for securing one end of the bellows to said stationary member, said securing means including an annular, stamped sheet-metal part joined at one end to said bellows and having an intermediate axial portion adapted to sealingly cooperate with said stationary member through an annular packing therebetween, an annular face seal adapted to engage a radial face on said shaft, means securing said annular face seal with respect to the other end of said bellows including an annular, stamped sheet-metal part fixed at one end to said bellows and having an axial portion surrounding said face seal, and a flexible annular member between said face seal and the axial portion of said last mentioned stamped sheet metal part, said first mentioned stamped sheet-metal part including a portion adapted to closely surround said shaft and to be connected to said stationary member by clamping means which presses said stamped sheet-metal part portion against said stationary member.

21. A seal assembly as claimed in claim 20, said last mentioned sheet-metal part including an annular portion integrally formed with said axial portion and extending radially inwardly toward said shaft, and another annular portion integrally formed with said first mentioned annular portion and extending radially outwardly of said shaft and joined to said bellows at its outer edge.

22. A seal assembly as claimed in claim 20, said first mentioned stamped sheet-metal part including an annular sheet-metal adaptor and tailpiece which are welded in one pass to said bellows.

* * * * *

Disclaimer 4,365,816.—*Norman E. Johnson*, Barrington and *Daniel F. Vasconcellos*, East Greenwich, R.I. SELF-DAMPING BELLOWS SEAL ASSEMBLY. Patent dated Dec. 28, 1982. Disclaimer filed May 18, 1983, by the assignee, *EG&G Sealol, Inc.*

Hereby enters this disclaimer to claims 2, 3 and 14 of said patent.

[*Official Gazette September 27, 1983.*]